US008146311B2

(12) United States Patent  
Certuse, Jr.

(10) Patent No.: US 8,146,311 B2
(45) Date of Patent: Apr. 3, 2012

(54) METHOD AND SYSTEM FOR INSULATING PIPING IN AN EXTERIOR WALL

(75) Inventor: John Certuse, Jr., Attleboro, MA (US)

(73) Assignee: Insulation Systems, LLC, Attleboro, MA (US)

( * ) Notice: Subject to any disclaimer, the term of this patent is extended or adjusted under 35 U.S.C. 154(b) by 269 days.

(21) Appl. No.: 12/246,588

(22) Filed: Oct. 7, 2008

(65) Prior Publication Data

US 2010/0083600 A1   Apr. 8, 2010

(51) Int. Cl.
*E04C 2/52* (2006.01)
*E04B 1/74* (2006.01)
*E03B 7/10* (2006.01)
*F16L 9/14* (2006.01)

(52) U.S. Cl. ......... 52/407.3; 52/220.1; 138/32; 138/149

(58) Field of Classification Search ........... 52/95, 220.1, 52/220.3, 317, 406.1, 407.3; 138/32, 149, 138/151, 152; 237/69
See application file for complete search history.

(56) References Cited

U.S. PATENT DOCUMENTS

| | | | |
|---|---|---|---|
| 3,191,632 A | 6/1965 | Keiding | |
| 3,479,779 A * | 11/1969 | Ziegler | 52/144 |
| 3,670,764 A | 6/1972 | Tindal | |
| 3,904,379 A | 9/1975 | Oser et al. | |
| 4,212,348 A * | 7/1980 | Kobayashi | 165/49 |
| 4,584,217 A | 4/1986 | McClintock | |
| 4,646,814 A * | 3/1987 | Fennesz | 165/56 |
| 4,772,507 A | 9/1988 | Leo, Jr. et al. | |
| 4,967,799 A | 11/1990 | Bradshaw et al. | |
| 5,007,222 A | 4/1991 | Raymond | |
| 5,123,453 A | 6/1992 | Robbins | |
| 5,192,039 A | 3/1993 | Williams | |
| 5,381,833 A | 1/1995 | Cummings et al. | |
| 5,427,849 A | 6/1995 | McClintock et al. | |
| 5,601,894 A * | 2/1997 | Maruschak | 428/36.9 |
| 6,000,420 A | 12/1999 | Nicholson et al. | |
| 6,016,846 A | 1/2000 | Knittel et al. | |
| 6,196,272 B1 | 3/2001 | Davis et al. | |
| RE37,279 E | 7/2001 | Fisher et al. | |
| 6,460,576 B2 | 10/2002 | Vitoorapakorn | |
| 6,805,298 B1 * | 10/2004 | Corbett | 237/69 |

(Continued)

FOREIGN PATENT DOCUMENTS

DE    202006011374 U1   10/2006

(Continued)

*Primary Examiner* — Eileen D Lillis
*Assistant Examiner* — Ryan Kwiecinski
(74) *Attorney, Agent, or Firm* — Barlow, Josephs & Holmes, Ltd.

(57) ABSTRACT

A method and system is provided for insulating piping installed in an exterior wall in a manner that protects the piping from freezing. Generally, the system includes an insulation block that has an interior side, an exterior side and a slot formed therein for receiving a pipe to be insulated adjacent the interior side, wherein the block is dimensioned particularly for installation into a building wall cavity. When installed, the block insures that the piping is positioned immediately adjacent the back surface of the interior sheathing material. The insulation block reliably provides a thickness of insulation material behind the piping such that the insulation material is positioned between the piping and the exterior wall surface while also maintaining the piping in contact with the rear surface of the interior wall sheathing to facilitate heat transfer from the interior of the building and into the piping.

19 Claims, 5 Drawing Sheets

U.S. PATENT DOCUMENTS

| | | |
|---|---|---|
| 7,650,911 B2 * | 1/2010 | Follett et al. .................. 138/108 |
| 2003/0056451 A1 | 3/2003 | Plsek et al. |
| 2003/0218075 A1 * | 11/2003 | Muir ................................ 237/69 |
| 2004/0040693 A1 * | 3/2004 | Fiedrich ........................... 165/56 |
| 2008/0104913 A1 * | 5/2008 | Messenger et al. .......... 52/309.9 |
| 2009/0101306 A1 * | 4/2009 | Reis et al. ....................... 165/56 |
| 2009/0113820 A1 * | 5/2009 | Deans ........................ 52/169.14 |
| 2010/0011699 A1 * | 1/2010 | Weimer et al. ............... 52/745.1 |

FOREIGN PATENT DOCUMENTS

| | | |
|---|---|---|
| EP | 0551640 A1 | 12/1992 |
| JP | 03225124 A * | 10/1991 |

\* cited by examiner

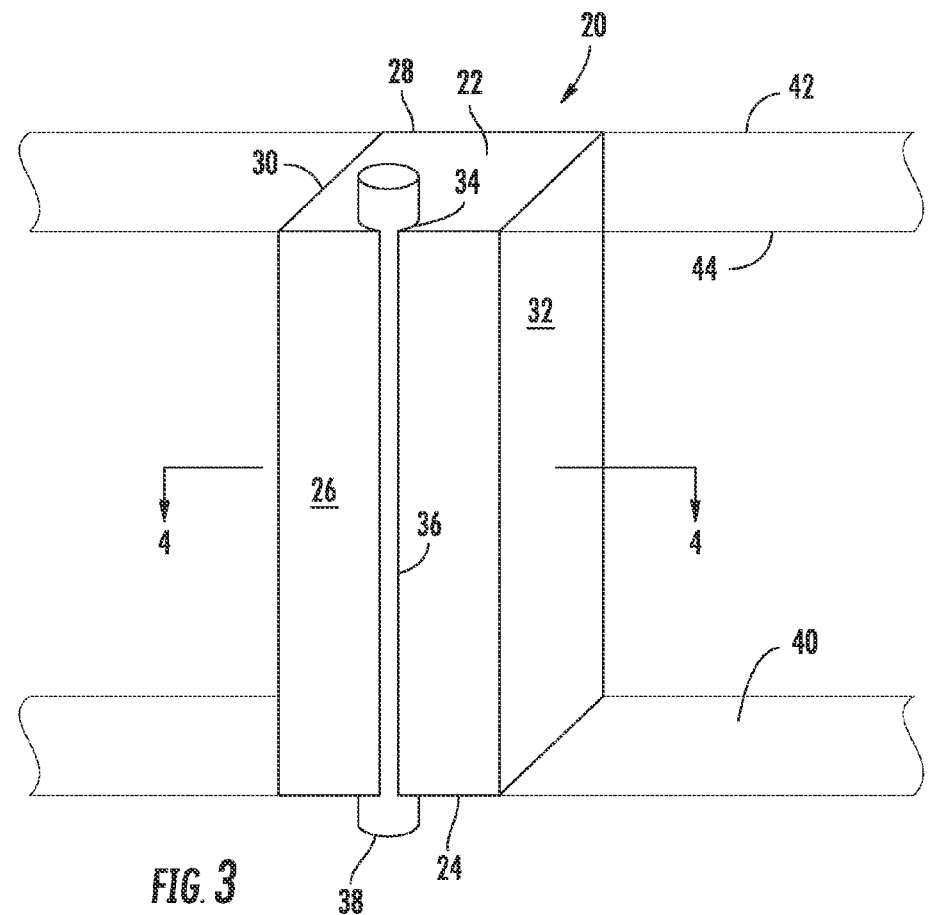
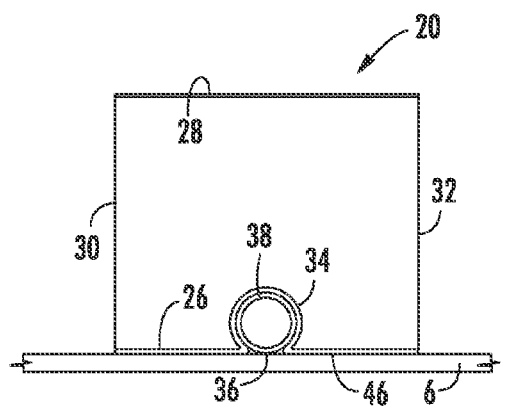 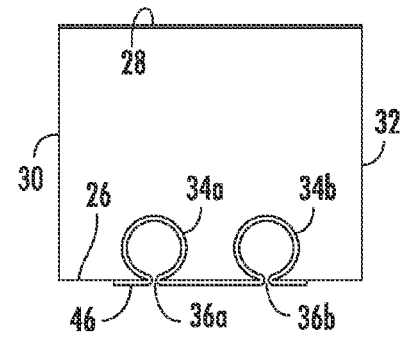

METHOD AND SYSTEM FOR INSULATING PIPING IN AN EXTERIOR WALL

BACKGROUND OF THE INVENTION

The present invention relates generally to a method and system for insulating piping. More specifically, the present invention relates to a method and system for effectively insulating piping located in an exterior wall construction in a manner that protects the piping from freezing.

In the construction of residential and commercial structures a variety of piping systems are installed to allow delivery of water to various plumbing fixtures such as sinks and toilets. Further, hydronic piping is installed to circulate a fluid medium, which is some cases is simply water, to effect heat transfer in order to heat the space. Often, due to the design of the space or the location of the various fixtures and heating elements, such piping must be located adjacent or within the cavity of the exterior walls of the structure. The difficulty created in these instances is that during the winter the temperature outside the wall construction and often within the wall cavity itself fall below 32° F., the freezing point of the water contained within these piping systems. When examined closely, the heat profile of a typical wall construction can be seen to have temperatures approaching the interior ambient temperature at the inner surface of the drywall within the wall bay and temperatures approaching exterior cold temperatures at the inner surface of the exterior sheathing within the same wall bay. Turning to FIG. 1, A typical wall construction can be seen having a wall cavity 2 filled with R-19 insulation 4 sandwiched between drywall 6 on the interior surface and plywood 8 and shingles 10 on the exterior surface. Given an interior condition I having ambient temperature of 70° F. and an exterior condition E of 5° F. with a 15 MPH wind the temperature of profile within the wall cavity 2 can be seen to reach as low as 9.93° F. at the interior surface A of the exterior sheathing 8. While theoretically the piping can be protected from freezing provided that it is positioned on the interior half of the wall C where temperature can be seen to be above 38° F., actual practice does not always meet the theoretical design requirements as will be discussed below.

Since it is well recognized that the space in the wall cavity of an exterior wall can often reach freezing temperatures, the International Plumbing Code and most state plumbing codes provide a basic requirement that domestic water pipes installed in outside walls shall be protected from freezing either by heat, insulation or both. One issue with such code provisions, however, is that fact that the code does not provide any specific direction as to how such protection against freezing should be provided. Further, while these code provisions apply to domestic water supplies, the difficulty arises in that the parallel code relating to heating systems has not provided any requirements regarding the protection of hydronic piping from freezing. This situation is further aggravated because the lack of direction a code level has translated directly into a lack of industry support for the installation of insulation on hydronic piping in exterior walls. As a result, there have been a large number of pipe failures directly tied to the freezing of the piping installed in exterior walls, wherein the pipe failure has caused extensive building damage.

Turning to FIG. 2, generally, in the prior art, installers simply provide for the installation of their piping 12 into the wall cavity prior to the insulation 4 of the building envelope. The installers then rely on the installer of the building insulation 4 to tuck the insulation material behind their piping 12 thereby theoretically positioning the piping 12 on the interior/warm side of the insulation 4 where it should be protected against freezing in most cases. While in theory such a practice should work, in most cases the actual installation does not comport with the theoretical ideal. For example, the installer of the insulation 4 may find it easier to install the insulation 4 over the top of the piping 12a leaving the piping 12 on the cold side of the insulation 4. Further, the installer may simply stop the insulation on either side of the piping 12b leaving a gap 14 that directly exposes the piping 12b to the cold side of the wall.

There are a number of different pipe insulation products that are currently available on the market today. Such insulation is generally configured as a pipe wrap in the form of jacketed fiberglass or a rubber material. These materials are installed fully around the exterior surface of the pipe thereby insulating the pipe. The problem that most people do not appreciated about the prior art insulation is that they are designed to prevent heat loss from the interior of the pipe to the exterior of the pipe. In other words they are intended to maintain the interior temperature of the fluid within the pipe. These insulation materials are not designed to address piping installed in locations prone to freezing.

There is therefore a need for a method and system for insulating piping that is specifically configured and designed for applications in exterior walls where the pipes are prone to freezing. There is a further need for a method and system of insulating piping in an exterior wall that reliably insures that the piping is protected from freezing by insuring that the piping is maintained as near to the ambient temperature of the interior of the structure as possible.

BRIEF SUMMARY OF THE INVENTION

In this regard, the present invention provides a method and system for insulating piping installed in an exterior wall. More specifically, the present invention provides a method and system for effectively insulating piping located in an exterior wall construction in a manner that protects the piping from freezing. The system of the present invention provides for an insulation block that is dimensioned particularly for installation into a building wall cavity. The insulation block has an interior side and an exterior side and a slot formed therein for receiving a pipe to be insulated. More particularly, the thickness of the insulation block is configured to match the dimensions of standard framing members wherein the slot for receiving the piping insures that the piping is positioned immediately adjacent the back surface of the interior sheathing material. In this manner, the insulation system of the present invention protects the piping in two ways. First, the insulation block reliably provides a thickness of insulation material behind the piping such that the insulation material is positioned between the piping and the exterior wall surface. Second, the insulation maintains the piping in contact with the rear surface of the interior wall sheathing to facilitate heat transfer from the interior of the building and into the piping.

In other embodiments of the present invention, the insulation block may include adhesive on a rear surface thereof such that the insulation block can be adhered to the interior surface of the exterior wall sheathing when installed. In another embodiment, the front surface of the insulation block and interior surface of the slot may include a metallic tape or other heat transfer medium to increase the overall heat transfer from the interior sheathing to the piping received within the slot. Finally, the slot may be configured to extend nearly entirely around the piping received therein leaving only a small exposed region of the piping to be in contact with the rear surface of the interior sheathing.

Accordingly, it is an object of the present invention to provide a method and system for insulating piping that is specifically configured and designed for applications in exterior walls where the pipes are prone to freezing. It is a further object of the present invention to provide a method and system of insulating piping in an exterior wall that reliably insures that the piping is protected from freezing by insuring that the piping is maintained as near to the ambient temperature of the interior of the structure as possible. It is still a further object of the present invention to provide a system for insulating piping that reliably positions a thickness of insulation material behind the piping such that the insulation material is positioned between the piping and the exterior wall surface while also maintaining the piping in contact with the rear surface of the interior wall sheathing to facilitate heat transfer from the interior of the building and into the piping.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 3 is a front, perspective view of the insulation system of the present invention;

FIG. 4 is a cross-sectional view taken along line 4-4 of FIG. 3;

FIG. 5 is a cross-sectional view reflecting an alternate embodiment; and

DETAILED DESCRIPTION OF THE INVENTION

Figure 1:
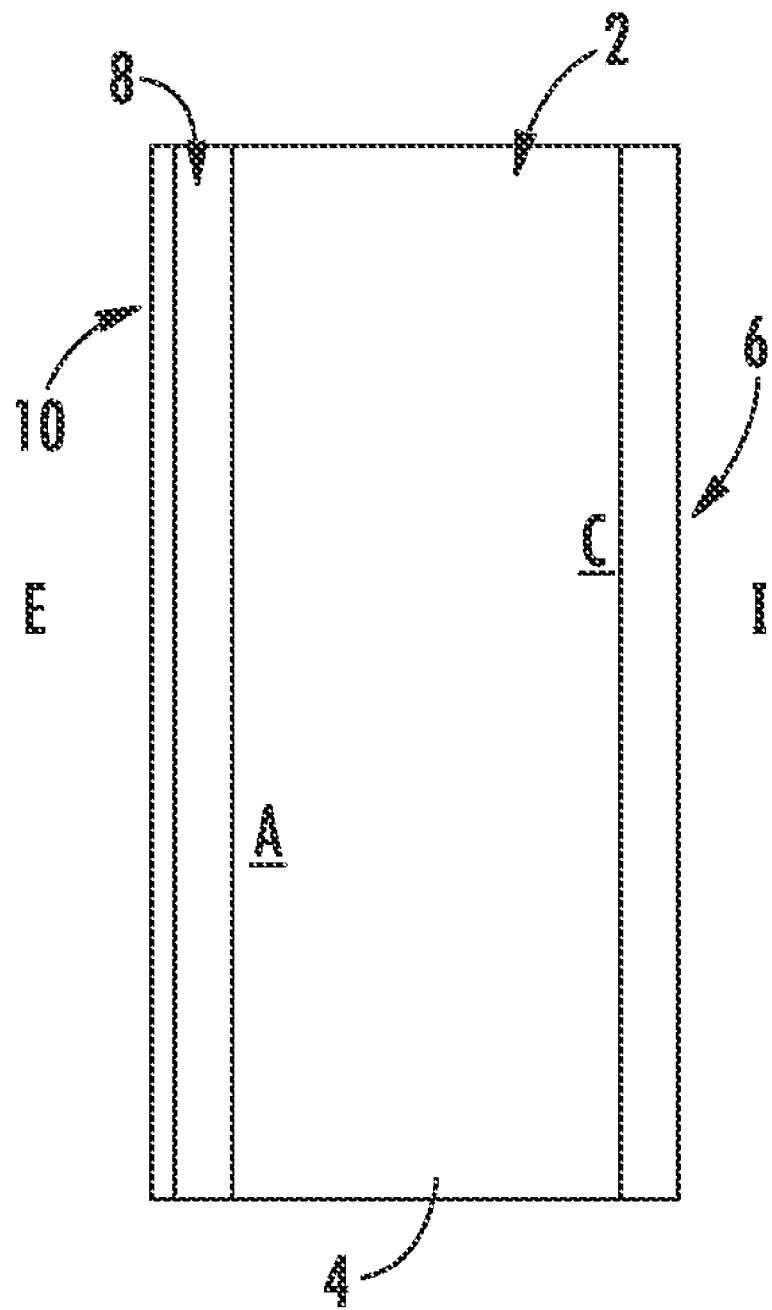
FIG. 1 is cross-sectional side view of prior art wall construction and the heat distribution therethrough.

Now referring to the drawings, method and system for insulating piping installed in an exterior wall is generally shown and illustrated. As was stated above, the present invention generally provides an improved method and system for effectively insulating piping located in an exterior wall construction in a manner that protects the piping from freezing.

Turning to FIG. 3, it can be seem that in its most general form, the system of the present invention provides for an insulation block 20 that is dimensioned particularly for installation into a building wall cavity. The insulation block 20 is generally regular in cross-section and is longitudinal extending from a proximal end 22 to a distal end 24. The insulation block 20 includes a front surface 26, a rear surface 28 and two side surfaces 30, 32 that all extend along a length of the insulation block 20 between the proximal 22 and distal 24 ends. The insulation block 20 can be seen to include at least one cavity 34 formed therein. It is preferred that the cavity 34 be formed in the insulation block 20 proximate the front surface 26 and that the cavity 34 extend along the length of the block 20 from the proximal end 22 to the distal end 24. In addition to the cavity 34, a slot 36 can be seen extending between the front surface 26 of the insulation block 20 and the cavity 34 formed therein. In operation, the cavity 34 in the insulation block 20 is configured to receive a pipe 38 therein such that a portion of the pipe 36 is exposed adjacent the front surface 26 of the insulation block 20.

The width or diameter of the cavity 34 is preferably the same size as that of the piping 38 to be received therein while the slot 36 is preferably narrower in width than the width/diameter of the cavity 34. This allows the piping 38 to be wrapped nearly fully by the insulation block 20 while leaving a space for the piping 38 to contact the rear surface of the interior sheathing.

It should be appreciated by one skilled in the art that while the insulation block 20 of the present invention is shown to be rectangular, such a profile was chosen for expediency and efficient use of material and extrusion equipment, any other profile shape may also be used and still fall within the scope of the present disclosure. Similarly, as will be descried below, the cavity 34 extends nearly entirely around the outer surface of the pipe 38 received therein leaving only a small exposed region of the piping 38 to be in contact with the rear surface of the interior sheathing. However, the cavity 34 may be formed to be square or U-shaped and still fall within the scope of the present disclosure.

Figure 2:
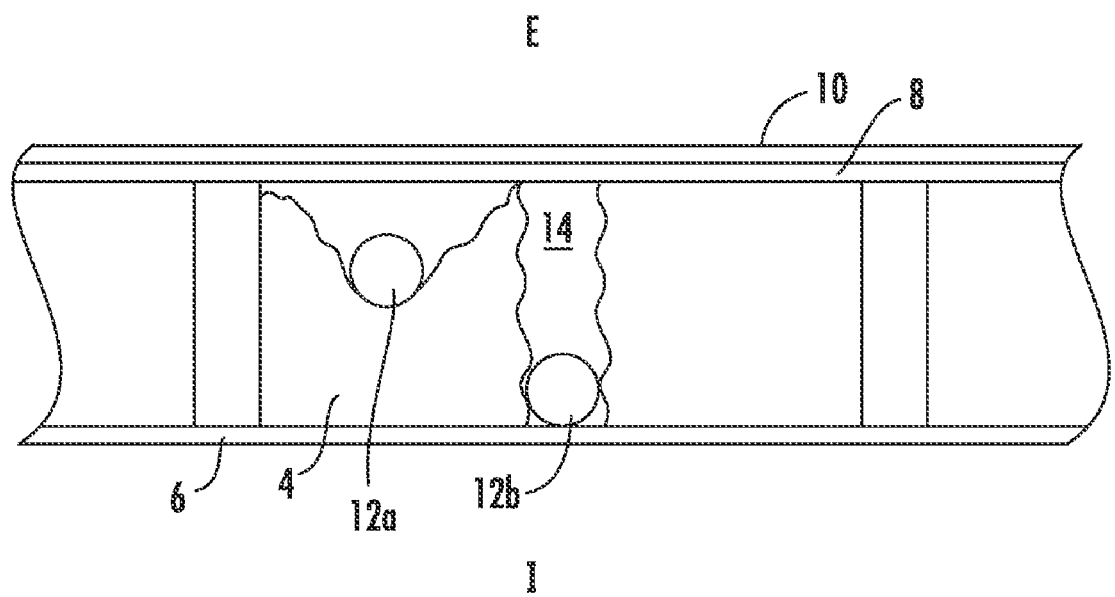
FIG. 2 is a cross-sectional plan view of prior art wall construction including piping installed therein.
Figure 4A:
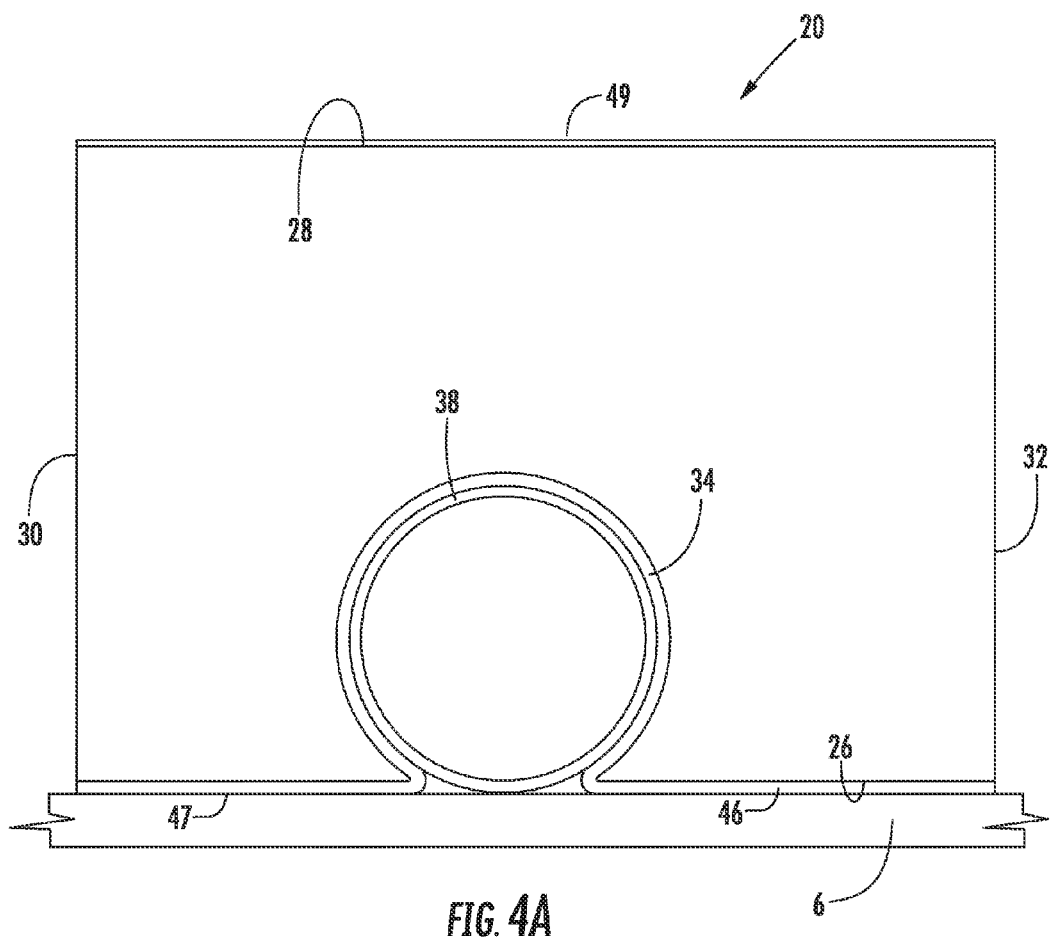
FIG. 4A is a close-up view of FIG. 4.

Turning now to FIGS. 4 and 4A in conjunction with FIG. 3, the insulation block 20 of the present invention is configured for installation into an exterior wall structure having a cavity therein. As is well known in the art and as described above in FIGS. 1 and 2, such cavities 40 within exterior wall structures are formed as the space between exterior sheathing 42 and interior sheathing 44 and as such the cavity 40 has a warm side and a cold side. In operation, the insulation block 20 of the present invention is installed into the cavity 40 such that the rear surface 28 of the insulation block 20 is received adjacent the cold side of the cavity and the front surface 26 is received the warm side. As a result, it can also be seen that the pipe 38 received within the insulation block 20 is necessarily positioned adjacent the warm side of the cavity 40 as well. In this manner, the insulation block 20 provides an insulation system that positions the pipe 38 installed in the exterior wall in a predictable position that approximates the same plane as that plane against which the buildings interior sheathing 44 will be secured.

As can be appreciated, the operative principal of the present invention is to facilitate heat transfer from the interior of the building and into the piping 38 to prevent freezing thereof. To enhance the overall ability of the insulation system to transfer heat into the piping 38 contained within the cavity 34, the insulation block 20 may also include a continuous thermally conductive layer 46 that covers the interior surface of the cavity 34, the slot 36 and at least a portion of the front surface 26 of the insulation block 20 proximate the slot 36. Similarly, the thermally conductive layer 46 may extend fully over the front surface 26 of the insulation block 20, although preferably, the thermally conductive surface 46 will end approximately ½ inch from the edge of the front face 26 of the insulation block 20 to prevent cold from being conducted into the pipe 38 at the edge of the contact surface. Preferably, the thermally conductive layer 46 is a metallic layer such as a metallic tape. It is still more preferable that the thermally conductive layer 46 includes an adhesive layer 47 thereon. By providing an adhesive layer 47 on the thermally conductive layer 46, the present invention insures a firm contact between the outer surface of the pipe 38 and the thermally conductive layer 46 in order to increase the heat transfer flow into the pipe 38. In this manner, the present invention employs a directional insulation technique wherein heat is selectively projected or converged into a desired area while heat loss is effectively prevented. In this manner the focused heat improves both the heat transfer efficiency (in hydronic piping) and to make use of heated sources such as an interior wall adjacent a heated space to protect a pipe from freezing in a susceptible area. As a result, the directional insulation concept makes maximum use of the buildings interior heat by diverting this heat source into the piping allowing the piping to be heated without the use of an external (i.e. electrical resistance heating) heat source.

In addition to providing adhesive 47 on the thermally conductive layer 46, it can be appreciated that the insulation block 20 may include adhesive 49 on a rear surface 28 thereof such that the insulation block 20 can be adhered to the interior surface of the exterior wall sheathing 42 when the insulation block 20 is installed. Similarly, the front surface 26 may include an adhesive layer that adheres to the rear surface of the interior wall sheathing 44 as it is installed.

While the previous figures show a single cavity 34 and slot 36 formed in the insulation block 20, it can be seen in FIG. 5 that the teachings of the present invention are expandable to include a plurality of cavities 34a, 34b and slots 36a, 36b to accommodate multiple water supply pipes or a hydronic supply and return line for example. In this regard, two slots 36a, 36b adjoining two cavities 34a, 34b within the insulation block 20 are shown. Further, the teachings are scalable to any plurality of slots and cavities.

The construction of the insulation block 20 in the preferred embodiment consists of an extruded square block of Polystyrene with an R-value of between 5 and 6.5 per inch with outside dimensions that are slightly wider than the wall construction into which the insulation block 20 will be installed although any type of material known in the art would be equally applicable and fall within the scope of the present invention. In this manner, the width of the block 20 will be on the order of $1/16^{th}$ to $1/8^{th}$ of an inch larger than the width of the framing member used in constructing the wall cavity 40, allowing the insulation block 20 to be compressed as the interior sheathing 44 is installed thereby maintaining the piping in firm contact with the rear surface of the interior sheathing 44. In this manner the insulation block 20 is in compression between the interior sheathing 44 and the exterior sheathing 42 and is adhered thereto by the layers of adhesive to improve the installation process, increase the conductive heat transfer and eliminate the possibility of cold air infiltration reaching the piping. Should the insulation block 20 need to installed into a wall cavity 40 where the piping 38 is already installed and unmovable, the block 20 may be formed in two pieces as required to facilitate installation. For example, the block 20 may be formed as a front and back half wherein the front piece is installed around the piping 38 and the back half is then slid in behind. The compression of the block 20 within the wall cavity 40 negates any possibility of insulation inconsistency.

Figure 6:
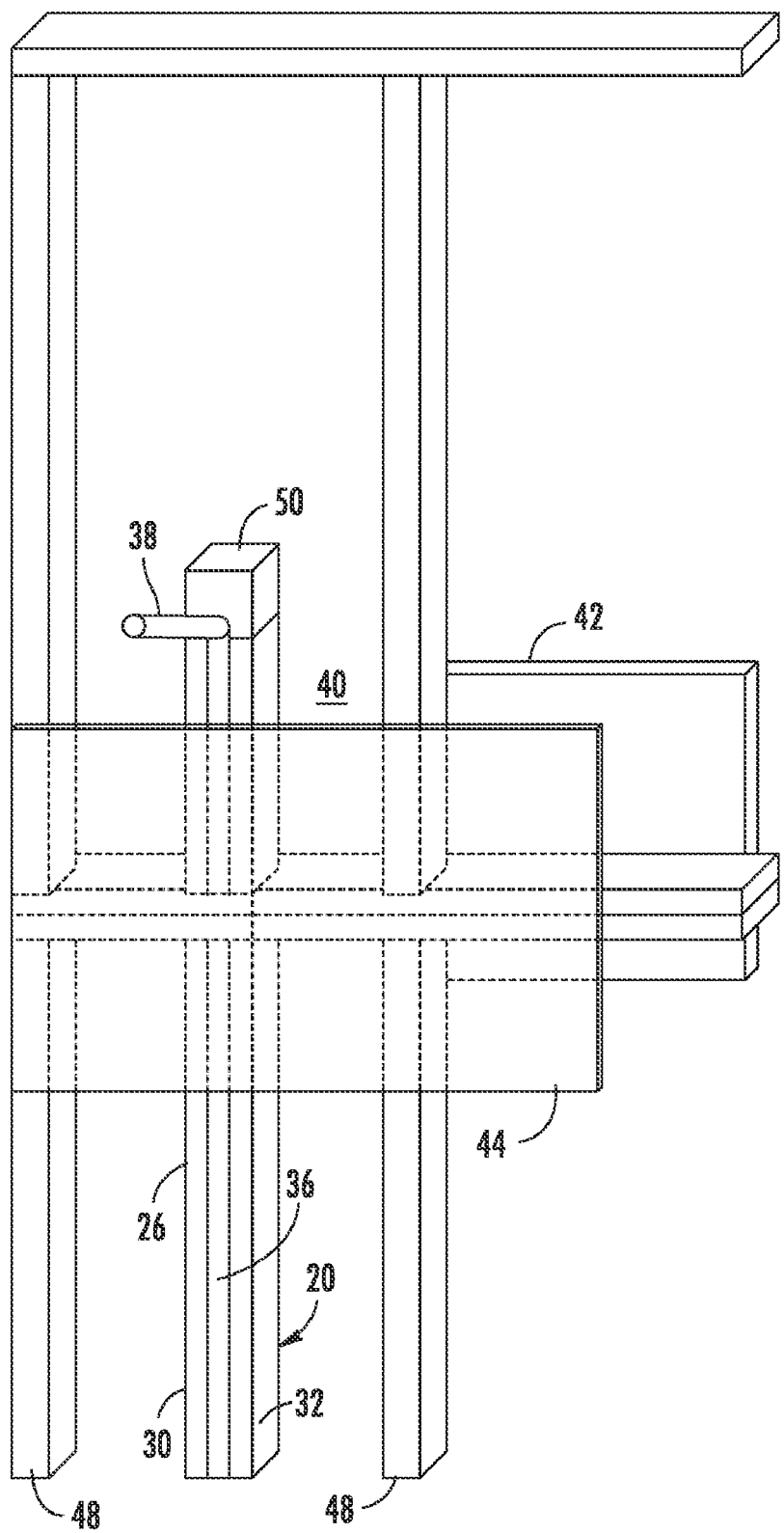
FIG. 6 is a perspective view of the insulation system of the present invention installed into a wall framing system.

FIG. 6 depicts the insulation block 20 of the present invention in an installed location in relation to an exterior wall structure. The exterior wall structure is formed to include a plurality of spaced apart framing members 48 wherein the framing members 48 support exterior sheathing 42 on one side and interior sheathing 44 on an opposing side thereof. The framing members 48, interior sheathing 44 and exterior sheathing 42 all cooperate to form a cavity 40 therebetween such that the cavity 40 has a warm side adjacent the interior sheathing 44 and a cold side adjacent the exterior sheathing 42. The insulation block 20 is received within the cavity 40 with the rear surface 28 adjacent the exterior sheathing 42 and the front surface 26 adjacent the interior sheathing 44 such that the slot 36 with said piping 38 therein is at least partially open to the rear surface of the interior sheathing 44.

As stated above, the insulation block 20 has a width that is slightly greater than the width of the framing members 48 into which it is installed. In 2×4 construction for example where the framing members 48 are 3½" wide, the insulation block 20 will have a width that is on the order of about 3 9/16" to about 3 5/8". Similarly, in 2×6, where the framing members 48 are 5½" the insulation block 20 will have a width that is on the order of about 5 9/16" to about 5 5/8". In this manner, the thickness of the insulation block 20 is configured to match the dimensions of standard framing members 48 wherein the slot 36 for receiving the piping 38 insures that the piping 38 is positioned immediately adjacent the back surface of the interior sheathing 44 material. As a result, the insulation system of the present invention protects the piping 38 in two ways. First, the insulation block 20 reliably provides a thickness of insulation material behind the piping 38 such that the insulation material is positioned between the piping and the exterior wall surface. Second, the insulation maintains the piping 38 in contact with the rear surface of the interior wall sheathing 44 to facilitate heat transfer from the interior of the building and into the piping 38.

As stated above, the rear surface 28 of the insulation block 20 includes a tape covered adhesive surface allowing the block 20 to be stuck to the inner surface of the wall's outer sheathing 42 allowing stabilization and securing of the insulation block 20 during the construction phase of the building. As can be further seen in FIG. 5, intersection blocks 50 will be provided to allow the insulation system to be continuous from where it enters the wall to where it exits the wall through a 90 degree turn preventing any portion of the piping 38 from being out of this insulated system. As is standard in the industry, typical fiberglass R-13 insulation will be applied to the remaining spaces within the wall cavity 40.

To facilitate installation of the insulation blocks of the present invention, a template tool may be provided in order to locate the proper location in the wall for the drilling of penetration holes and the installation of the piping. In this manner, a template showing the location of the hole to be drilled in the sill (2×4 or 2×6) members of the wall will facilitate correct installation of the piping to allow later installation of the insulation block.

It can therefore be seen that the present invention provides a method and system for effectively insulating piping located in an exterior wall construction in a manner that protects the piping from freezing. The insulation block reliably provides a thickness of insulation material behind the piping such that the insulation material is positioned between the piping and the exterior wall surface and the insulation maintains the piping in contact with the rear surface of the interior wall sheathing to facilitate heat transfer from the interior of the building and into the piping. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An insulation system for insulating piping contained in an exterior wall of a structure comprising:
   a rigid insulation block having a proximal end, a distal end and front and rear surfaces extending along a length of said insulation block between said proximal and distal ends;
   at least one cavity formed in said insulation block proximate said front surface and extending along the length of said block from said proximal end to said distal end; and
   a slot extending between said front surface and said at least one cavity wherein said cavity has a width that is greater than a width of said slot;
   wherein said at least one cavity is configured to receive a pipe therein such that said pipe is substantially fully surrounded by said rigid insulation except for a portion of said pipe that is exposed only at said slot and extends through said slot at said front surface of said insulation block.

2. The insulation system of claim 1, said exterior wall structure having a space formed therein, said space having a warm side and a cold side, said insulation system being received within said space with said rear surface adjacent said cold side and said front surface adjacent said warm side.

3. The insulation system of claim 1, further comprising:
   a continuous thermally conductive layer covering an interior surface of said cavity, said slot and at least a portion of said front surface of said block proximate said slot.

4. The insulation system of claim 3, wherein said thermally conductive layer is a metallic layer.

5. The insulation system of claim 3, wherein said thermally conductive layer has an adhesive layer thereon.

6. The insulation system of claim 1, wherein said front surface and said rear surface of said insulation block have adhesive layers thereon.

7. The insulation system of claim 1, wherein said cavity is circular and has a diameter that is greater than a width of said slot.

8. The insulation system of claim 1, said exterior wall structure having a plurality of spaced apart framing members, said framing members supporting exterior sheathing on one side and interior sheathing on an opposing side, said framing members, interior sheathing and exterior sheathing forming a space therebetween, said space having a warm side adjacent said interior sheathing and a cold side adjacent said exterior sheathing, said insulation system being received within said space with said rear surface adjacent said exterior sheathing and said front surface adjacent said interior sheathing, said slot with said piping therein being at least partially open to said interior sheathing.

9. The insulation system of claim 8, further comprising:
   a continuous thermally conductive layer covering an interior surface of said cavity, said slot and at least a portion of said front surface of said block proximate said slot, said thermally conductive layer being in thermal communication with said interior sheathing.

10. The insulation system of claim 9, wherein said thermally conductive layer is a metallic layer.

11. The insulation system of claim 8, wherein said cavity has a width that is greater than a width of said slot.

12. The insulation system of claim 8, wherein said cavity is circular and has a diameter that is greater than a width of said slot.

13. The insulation system of claim 8, wherein a pipe received in said cavity has an exterior surface that is partially exposed through said slot, said exposed exterior surface being in direct contact with said interior sheathing.

14. The insulation system of claim 8, wherein said rear surface of said insulation block has an adhesive layer thereon, said rear surface being adhered to said exterior sheathing upon installation into said space.

15. The insulation system of claim 14, wherein said front surface of said insulation block has an adhesive layer thereon, said front surface being adhered to said interior sheathing upon installation of said interior sheathing.

16. The insulation system of claim 8, said insulation block having a thickness between said front and rear surfaces that is approximately equal to a width of said framing members.

17. The insulation system of claim 8, said insulation block having a thickness between said front and rear surfaces that is slightly larger than a width of said framing members.

18. The insulation system of claim 17, wherein installation of said interior sheathing compresses said insulation block.

19. The insulation system of claim 1, wherein said at least one cavity is two cavities, said two cavities each configured to receive a pipe therein such that a portion of said pipe is exposed adjacent said front surface of said insulation block.

* * * * *